United States Patent
Shaw et al.

(10) Patent No.: US 9,204,302 B1
(45) Date of Patent: Dec. 1, 2015

(54) METHOD FOR SECURE VOICEMAIL ACCESS

(71) Applicant: Sprint Spectrum L.P., Overland Park, KS (US)

(72) Inventors: Jason Shaw, Olathe, KS (US); Tom M. Sladek, Olathe, KS (US); Tony Hoorn, Bunker Hill, WV (US)

(73) Assignee: Sprint Spectrum L.P., Overland Park, KS (US)

( * ) Notice: Subject to any disclaimer, the term of this patent is extended or adjusted under 35 U.S.C. 154(b) by 158 days.

(21) Appl. No.: 14/066,256

(22) Filed: Oct. 29, 2013

(51) Int. Cl.
  *H04M 1/66* (2006.01)
  *H04M 11/10* (2006.01)
  *H04W 12/06* (2009.01)
  *H04M 3/533* (2006.01)

(52) U.S. Cl.
  CPC .............. *H04W 12/06* (2013.01); *H04M 3/533* (2013.01)

(58) Field of Classification Search
  None
  See application file for complete search history.

(56) References Cited

U.S. PATENT DOCUMENTS

| | | | |
|---|---|---|---|
| 2010/0054433 A1* | 3/2010 | Gustave et al. | 379/88.23 |
| 2011/0117882 A1* | 5/2011 | Luu et al. | 455/410 |
| 2011/0143716 A1* | 6/2011 | Shaw | 455/411 |
| 2013/0205370 A1* | 8/2013 | Kalgi et al. | 726/3 |
| 2014/0099922 A1* | 4/2014 | Cazanas et al. | 455/411 |

OTHER PUBLICATIONS

Hawaiian Telcom Business Voicemail User Guide, Hawaiian Telcom 2010.

* cited by examiner

*Primary Examiner* — Erika A Washington

(57) ABSTRACT

Disclosed are methods and systems to authenticate a UE to grant the UE access to a voicemail account. A network entity and a UE may exchange a secure key that may then be used to authenticate the UE with the voicemail server. The exchange of the secure key may be triggered in response to receiving a user request to access a voicemail account at a voicemail server. The UE may then include the received secure key in an origination request seeking to set up a call to the voicemail server, and the voicemail server may authenticate the UE by comparing the secure key received in the origination request with the secure key most recently transmitted to the UE. If the received secure key is the same as the most recently transmitted secure key, the UE is authenticated.

19 Claims, 6 Drawing Sheets

METHOD FOR SECURE VOICEMAIL ACCESS

BACKGROUND

Unless otherwise indicated herein, the materials described in this section are not prior art to the claims and are not admitted to be prior art by inclusion in this section.

In conventional voicemail systems, a voicemail server defines voicemail accounts for a plurality of telephone numbers. Each telephone number may be associated with a particular user equipment device (UE), and each UE may be owned by or registered to a particular user or users. When an incoming call to an intended recipient at a particular telephone number is unanswered within a certain number of rings, the call may be directed to the voicemail server. The voicemail server may then allow the caller to record a voicemail message that may be retrieved by the intended recipient at a later time.

A voicemail user can typically access his or her voicemail account from various communication devices, such as from a UE registered to the user's telephone number or from other UEs. The user may connect with and gain access to his or her voicemail account in order to retrieve stored voicemail messages. Further, the user may connect with the voicemail account in order to perform various other functions, such as deleting voicemail messages, recording a personal greeting, and reviewing message details (e.g., timestamps).

OVERVIEW

A voicemail server may define voicemail accounts for a plurality of users. Each voicemail account may be associated with a particular telephone number. Further, the voicemail server may require one or more forms of authentication before the voicemail server allows a particular user to access his or her voicemail account. For example, the voicemail server may require the user to input a passcode before the voicemail server allows the user to gain access to the voicemail account of the user. In another example, the voicemail server may allow the user to bypass the step of inputting a passcode. For instance, the voicemail server may allow the user to bypass this step by enabling a "skip passcode" function so that the user may access their voicemail account without entering a passcode. In such an example, the voicemail server may compare the telephone number of the UE used to connect to the voicemail server with the telephone number associated with the voicemail account. If the telephone number of the UE used to connect to the voicemail server matches the telephone number associated with the voicemail account, the voicemail server may then grant the UE access to the voicemail account without requiring the user to enter a passcode.

Unfortunately, this form of authentication is susceptible to being compromised. For instance, this form of authentication is susceptible to a technique commonly referred to as "spoofing." Spoofing occurs when a caller deliberately falsifies the telephone number relayed as the caller identification (Caller ID) information (and/or other information relayed as the Caller ID information, such as the name of the calling party) to disguise the true identity of the calling party. Using this technique, an individual may connect with the voicemail server by "spoofing" the telephone number of a user who has enabled "skip passcode." The voicemail server may thus identify the calling party as the user associated with the voicemail account, and the voicemail server may consequently allow access to an individual other than the proper user. Therefore, an improved form of authentication that grants a UE access to a voicemail account may be desirable.

Disclosed herein is a method and corresponding system to help improve the authentication process to grant a UE access to a voicemail account. In accordance with the disclosure, a network entity and a UE may exchange a secure key that may then be used to authenticate the UE with the voicemail server. The exchange of the secure key may be triggered in response to receiving a user request to access a voicemail account at a voicemail server. The secure key may be a different key that is generated each time the user requests to access the voicemail account. The UE may then include the received secure key in an origination request seeking to set up a call to the voicemail server, and the voicemail server may authenticate the UE by comparing the secure key received in the origination request with the secure key most recently transmitted to the UE. If the received secure key is the same as the most recently transmitted secure key, the UE is authenticated. In that case, the UE may then be automatically granted access to the voicemail account. Whereas, if the received secure key is not the same as the most recently transmitted secure key, then the user may be prompted to enter a passcode in order for the UE to gain access to the voicemail account. Other examples are possible as well.

One embodiment of the present disclosure takes the form of a method carried out by a UE. The method includes the UE receiving a user input indicating a request to access a voicemail account at a voicemail server. In response to receiving the user input, the method then includes the UE transmitting to a network entity a request for a secure key. The method then includes receiving from the network entity a response providing the secure key. In response to the UE receiving the response providing the secure key, the method then includes the UE transmitting to the voicemail server an origination request, wherein the origination request includes the received secure key. The method then includes receiving into the UE from the voicemail server, a message responsive to the origination request.

Another embodiment of the present disclosure provides a computing device. The device includes a processor and data storage. Further, the device includes program instructions stored in the data storage and executable by the processor to carry out functions including those of the just-described method.

Yet another embodiment of the present disclosure provides a method carried out by a voicemail server. The method includes the voicemail server receiving from a UE a request for a secure key. In response to receiving the request for a secure key, the method then includes the voicemail server generating a first secure key and transmitting the first secure key to the UE. The method then includes the voicemail server receiving an origination request from the UE, wherein the origination request includes a second secure key. The method then includes the voicemail server comparing the first secure key transmitted to the UE from the voicemail server with the second secure key received by the voicemail server in the origination request from the UE. The method then includes the voicemail server granting the UE access to the voicemail account if the first secure key is the same as the second secure key, but if the first secure key is different than the second secure key, then the method includes the voicemail server transmitting to the UE a request for further authentication to access the voicemail account.

These and other aspects will become apparent to those of ordinary skill in the art by reading the following detailed description, with reference where appropriate to the accom-

DETAILED DESCRIPTION

The present method and corresponding device will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

I. EXAMPLE ARCHITECTURE a. Example Communication Networks

Figure 1:
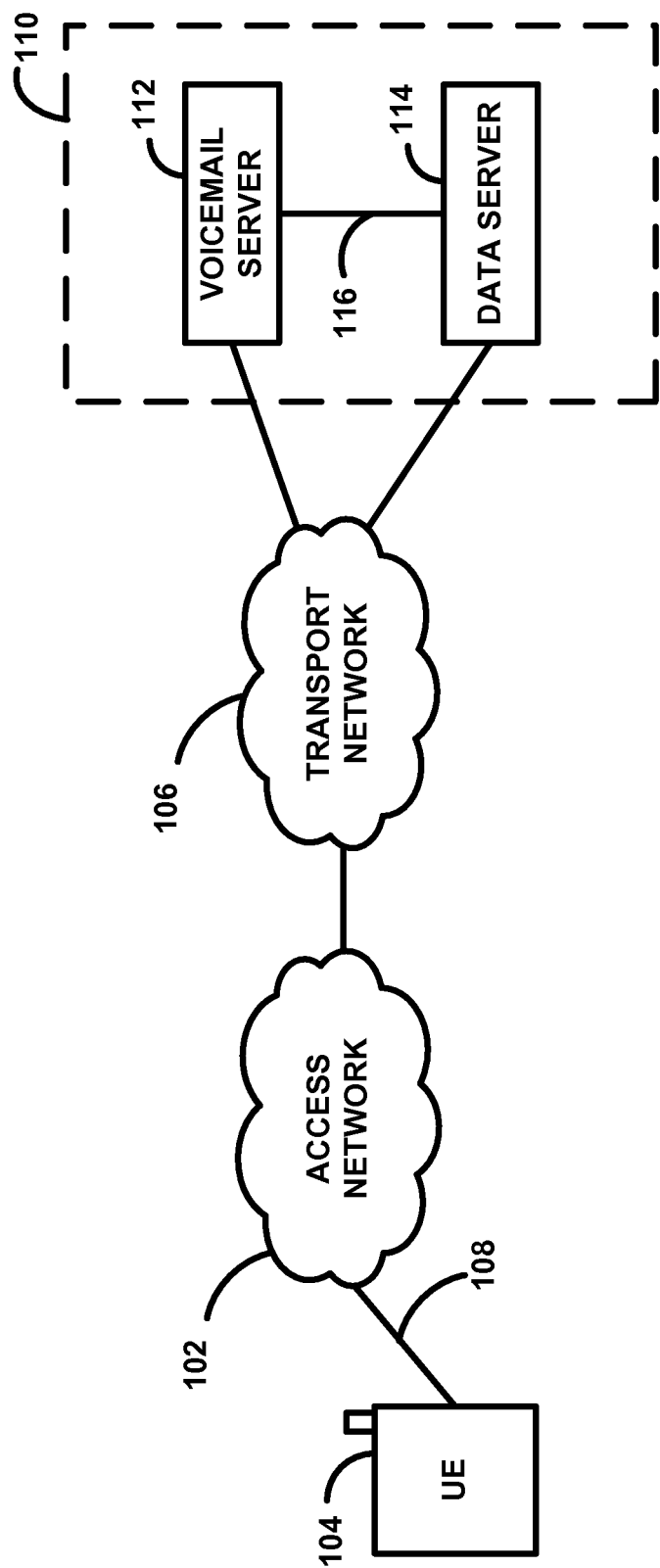
FIG. 1 is a simplified block diagram of a network arrangement in which an exemplary embodiment of the present method and apparatus can be implemented.

FIG. 1 is a simplified block diagram of an example network arrangement in which the present method can be implemented. As shown, the arrangement includes an access network 102 that functions to provide one or more UEs with connectivity to one or more transport networks. In particular, the access network 102 is shown providing a representative UE 104 with connectivity to a representative transport network 106.

Access network 102 may be structured to provide various types of connectivity, such as landline, wireless, circuit-switched, and/or packet-switched, for various type of communications, such as voice and/or data for instance, and UE 104 and transport network 106 may be similarly configured. For instance, access network 102 may be a landline telephone network that provides circuit-switched connectivity for public switched telephone network (PSTN) communications, in which case UE 104 may be a traditional landline telephone that engages in landline communication via communication link 108 with the access network 102, and transport network 106 may be the PSTN. Alternatively, access network 102 may be a radio access network that provides connectivity with the PSTN and/or the Internet, in which case UE 104 may be a wireless communication device that engages in wireless communication via communication link 108 with the access network 102, and transport network 106 may be the PSTN or the Internet.

As a specific example, access network 102 may be a cellular wireless network that includes one or more wireless base stations arranged to serve representative UE 104 in accordance with an air interface protocol such as Orthogonal Frequency Division Multiple Access (OFDMA (e.g., Long Term Evolution (LTE) or Wireless Interoperability for Microwave Access (WiMAX)), Code Division Multiple Access (CDMA), Global System for Mobile Communications (GSM), WIFI, or the like, and a switch or gateway that connects with the transport network 106 such as the PSTN or the Internet. Representative UE 104 may then be a wireless communication device such as a cell phone, wirelessly-equipped computer, embedded wireless module, or the like, configured to be served wirelessly by such a base station and to engage in voice and/or data communication via the base station and a switch or gateway with entities on the PSTN or Internet.

Using the simplified network configuration of FIG. 1, the UE 104 can engage in communication sessions with one or more servers 110 via the access network 102. The one or more servers 110 may include a voicemail server 112 and/or a data server 114, as an example. The voicemail server 112 and the data server 114 may be one entity or separate entities. If the voicemail server 112 and data server 114 are separate entities, those entities may be in communication via communication link 116. A communication session between the UE 104 and the server(s) 110 may involve the exchange of a secure key that may then be used to authenticate the UE 104 with the voicemail server 112. In one particular example, the UE 104 may initiate a data session with the voicemail server 112 or the data server 114, and receive a secure key from the voicemail server 112 or the data server 114. The UE may subsequently transmit the received secure key to the voicemail server 112 in an origination request seeking to set up a voice over IP (VoIP) session with the voicemail server 112. The voicemail server 112 may then authenticate the UE 104 by comparing the secure key received in the origination request with the secure key most recently transmitted to the UE 104.

Figure 2:
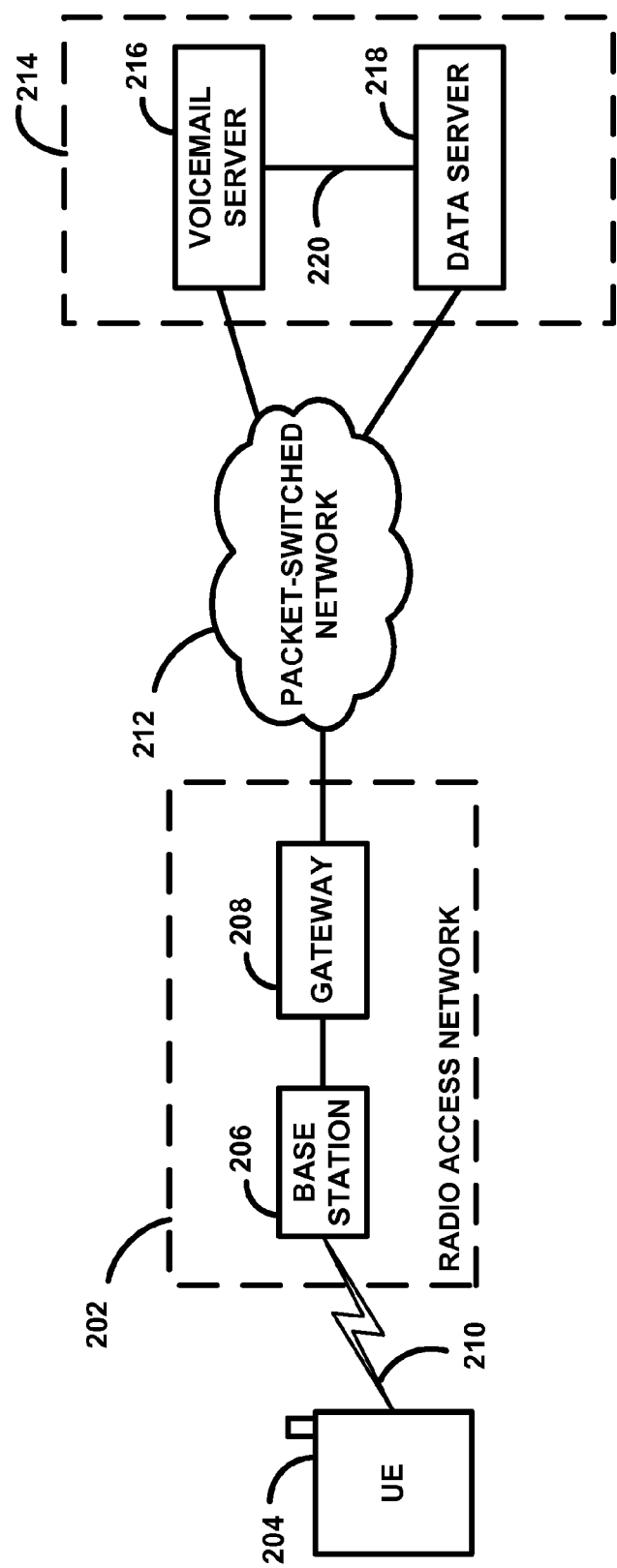
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, access network 202 is a radio access network that includes a base station 206 that provides a coverage area within which an example UE 204 can operate. The UE 204 can be a wireless communication device, such as a cell phone, wirelessly-equipped computer, embedded wireless module, or the like, that is configured to connect to the base station 206 through a wireless communication link 210. Access network 202 further includes one or more switches or gateways 208 that provide connectivity with one or more packet-switched networks 212 such as the Internet.

In this arrangement, the wireless communication link 210 may be configured according to a particular air interface protocol, and the UE 204 and base station 206 may be programmed or otherwise configured to operate according to that protocol. In one example, the air interface protocol may be Long Term Evolution (LTE). In such an example, access network 202 may be an LTE network that primarily serves UEs with wireless packet data communication service (including perhaps voice-over-packet and other packet-based real-time media service). Further, the base station 206 may be a base station known as an eNodeB, which includes an antenna structure and associated equipment for engaging in LTE communication over the wireless communication link 210 with UE 204.

Using the simplified network configuration of FIG. 2, the UE 104 can engage in communication sessions with one or more servers 214 via the access network 202. Similar to the configuration in FIG. 1, the server(s) 214 may include a voicemail server 216 and/or a data server 218, and the voicemail server 216 and the data server 218 may be one entity or separate entities. If the voicemail server 216 and data server 208 are separate entities, those entities may be in communication via communication link 220. As described above, a communication session between the UE 204 and the server(s) 214 may involve the exchange of a secure key that may then be used to authenticate the UE 204 with the voicemail server 216.

b. Example Network Entity

Figure 3:
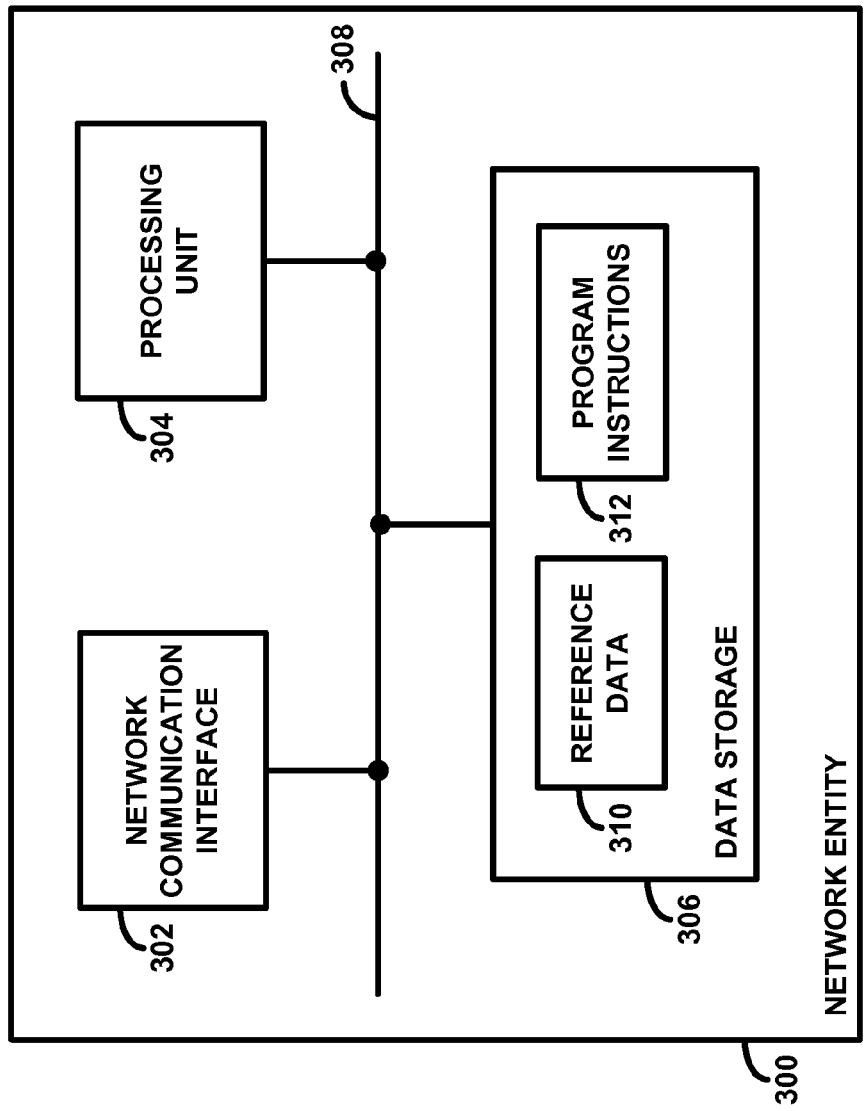
FIG. 3 is a simplified block diagram depicting components of a network entity that may carry out aspects of the methods.

FIG. 3 is next a simplified block diagram depicting components of an example network entity 300 that may be arranged to carry out various aspects of the present method. The network entity 300 may be a voicemail server, a data server, and/or some other entity. As shown in FIG. 3, the components include a network communication interface 302, a processing unit 304, and data storage 306, all of which may be communicatively linked together by a system bus, network, or other connection mechanism 308.

In this example arrangement, network communication interface 302 functions to facilitate communication with various other entities. As such, the interface may include a wired or wireless Ethernet module or other interface, depending on the manner in which communication will occur. In one particular example, the network communication interface 302 may be used to transmit a secure key to a UE, for subsequent use to authorize the UE with a voicemail server. In another example, the network entity 300 may be a data server that is in communication with a voicemail server via the network communication interface 302. In such an example, the network communication interface 302 may be used to share secure key data transmitted to various UEs. Processing unit 304 may then comprise one or more general purpose processors (e.g., microprocessors) and/or one or more special purpose processors (e.g., application specific integrated circuits or digital signal processors). Data storage 306 may comprise one or more volatile and/or non-volatile storage components (non-transitory), such as magnetic, optical, flash, or organic storage components.

As shown, data storage 306 may contain reference data 310 and program instructions 312. Reference data 310 may comprise secure key data for each of various UEs and may thus associate a transmitted secure key with a particular UE, as discussed in more detail below. Program instructions 312, in turn, may then comprise machine language instructions or the like that are executable by the processing unit 304 to carry out various functions described herein. For example, the functions may include comparing a secure key transmitted by the network entity 300 to a UE with a secure key received by the network entity 300 from the UE, and granting the UE access to a voicemail account if the secure keys are the same. Other examples are possible as well.

c. Example User Equipment Device

Figure 4:
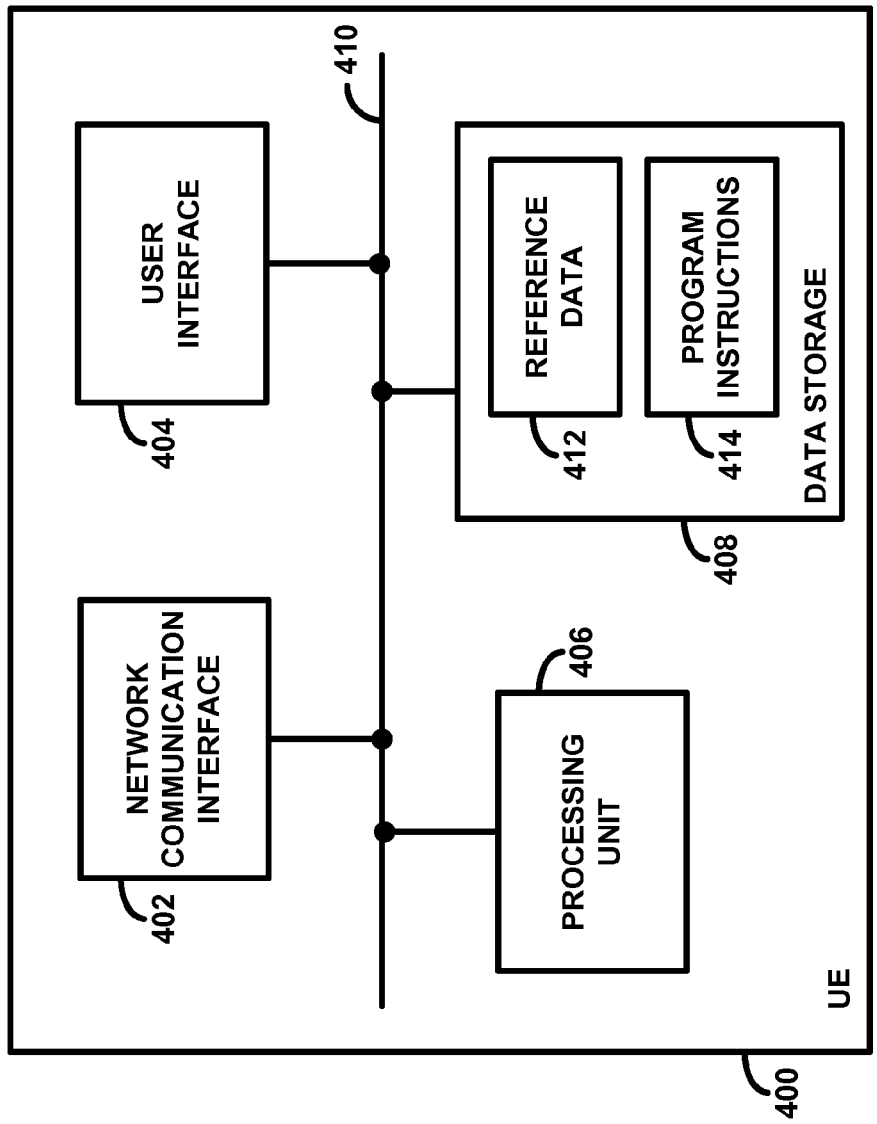
FIG. 4 is a simplified block diagram depicting components of a user equipment device that may carry out aspects of the methods.

FIG. 4 is then a simplified block diagram depicting components of an example UE 400 that may be arranged to carry out various aspects of the present method. As shown, the example UE 400 includes a network communication interface 402, a user interface 404, a processing unit 406, and data storage 408, all of which may be communicatively linked together by a system bus, network, or other connection mechanism 410.

In this example arrangement, network communication interface 402 functions to facilitate communication with one or more access networks and network entities, such as those discussed above for instance, and may thus take various forms to facilitate various types of communication such as wireless, landline, circuit-switched, and/or packet-switched communication. For example, the network communication interface 402 may comprise a wireless communication chipset and antenna structure configured to communicate with one or more radio access networks, such as the network shown in FIG. 2.

User interface 404 may then comprise one or more user interface components to facilitate interaction with a user of the UE, including input components such a keypad, touch-sensitive surface, microphone, and camera, and output components such as a display screen and sound speaker. Further, processing unit 406 may comprise one or more general purpose processors (e.g., microprocessors) and/or one or more special purpose processors (e.g., application specific integrated circuits or digital signal processors).

As shown, data storage 408 may comprise one or more volatile and/or non-volatile storage components (non-transitory), such as magnetic, optical, flash, or organic storage components. Data storage 408 may contain reference data 412 and program instructions 414. Reference data 412 may comprise data such as one or more stored identifiers of UE 400 (e.g., a mobile identification number or electronic serial number). Program instructions 414 may comprise machine language instructions executable by processing unit 406 to carry out various UE functions described herein. For example, the functions may include transmitting a request for a secure key in response to receiving a user input indicating a request to access a voicemail account, receiving the secure key from a network entity, and transmitting the secure key to a voicemail server to facilitate access to a voicemail account. Other examples are possible as well.

II. EXAMPLE OPERATION

As discussed above, a voicemail server may require one or more forms of authentication before the voicemail server allows a particular user to access his or her voicemail account. For example, the voicemail server may require the user to input a passcode before the voicemail server allows the user to gain access to the voicemail account of the user. However, a user may desire to access his or her voicemail account without inputting a passcode. In such a case, the voicemail system may allow the user to bypass this step by enabling a "skip passcode" function so that the user may access their voicemail account without entering a passcode. In order to authenticate a user who has enabled the "skip passcode" function, the voicemail server may compare the telephone number of the UE used to connect to the voicemail server with the telephone number associated with the voicemail account. If the telephone number of the UE used to connect to the voicemail server matches the telephone number associated with the voicemail account, the voicemail server may then grant the UE access to the voicemail account without requiring the user to enter a passcode.

Unfortunately, this form of authentication is susceptible to spoofing, as discussed above. In particular, an individual may connect with the voicemail server by "spoofing" the telephone number of a user who has enabled "skip passcode," and the voicemail server may thus identify the calling party as the user associated with the voicemail account and consequently allow access to an individual other than the proper user. Therefore, an improved form of authentication that grants a UE access to a voicemail account may be desirable.

Figure 5:
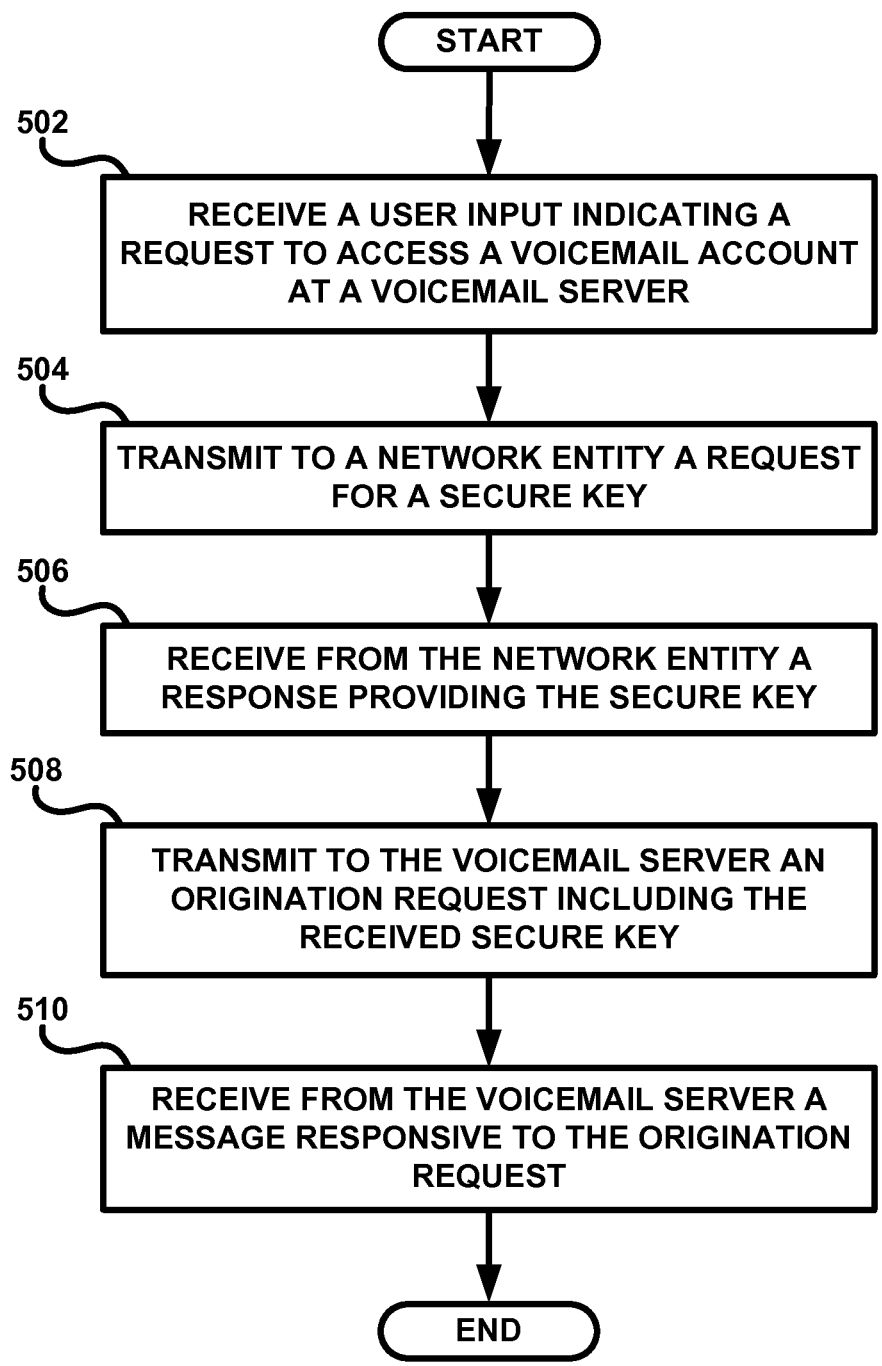
FIG. 5 is a flow chart depicting functions that can be carried out in accordance with the method.

FIG. 5 is a flowchart depicting functions that may be carried out in accordance with at least one embodiment of the present disclosure. Although the blocks are shown in a sequential order, the functions represented by these blocks could instead be carried out in parallel and/or in a different order than that described herein, unless context clearly dictates otherwise. Further, the various blocks may be combined into fewer blocks, divided into additional blocks, and/or removed based upon the specifics of a given implementation.

At block 502, the method begins with the UE receiving a user input indicating a request to access a voicemail account at a voicemail server. In one example, the user may request to access the voicemail account by dialing the phone number associated with that particular UE. In another example, the user may push a single button, or press an icon on a touch pad to trigger a request to access the voicemail account. Other examples are possible as well.

At block 504, the UE transmits to a network entity a request for a secure key. As discussed above, the UE is configured to transmit the request for the secure key in response to receiving the user input indicating a request to access a voicemail account. In one example, the UE transmits the request for the secure key to the network entity via a hypertext transfer protocol secure (HTTPS) connection. The UE may be configured with the address of a particular network entity, and the UE may send the request for the secure key to that entity. The network entity may be a voicemail server, a data server, or some other network entity as described above in relation to FIG. 3. The UE may transmit the request for the secure key to the network entity via an access network, such as the access network 102 described in FIG. 1, or the access network 202 described in FIG. 2.

Further, the request for a secure key may include a unique identifier of the UE. The network entity may associate the unique identifier of a particular UE with the secure key transmitted to that UE. The unique identifier can include, for example, a unique electronic serial number (ESN), a mobile equipment identifier (MEID), an international mobile subscriber identity (IMSI), and/or a unique mobile identification number (MIN). The ESN and the MEID, which may be hard-coded into the UE or stored on a SIM card, identifies the UE as a unique physical device and usually includes a manufacturer code and a manufacturer-assigned serial number. The MIN and the IMSI, on the other hand, is typically assigned to the UE by a cellular provider and can function as a subscriber ID.

TABLE 1

| Unique Identifier of UE | Most Recently Transmitted Secure Key |
|---|---|
| A0123456789012 | Secure Key 1 |
| C2584167930248 | Secure Key 2 |
| F6974015893647 | Secure Key 3 |

Table 1 illustrates example reference data 310 stored in the data storage 306 of the network entity 300. In this example table, a first UE has a unique MEID A0123456789012 and received Secure Key 1 from the network entity 300. The MEID A0123456789012 is associated with Secure Key 1, and that association may be used for later authentication of the UE. Similarly, a second UE with an MEID C2584167930248 received Secure Key 2, and a third UE with an MEID F6974015893647 received Secure Key 3. As discussed above, the network entity 300 may generate a new secure key each time a user requests to access the voicemail account. In such a case for a given UE, the network entity 300 could just store the most recently transmitted secure key in its reference data 310.

At block 506, the UE receives from the network entity a response providing the secure key. In one example, the network entity transmits the secure key to the UE via an HTTPS connection. The secure key may be an RSA key, although the network entity may transmit (and the UE may receive) other types of secure keys instead. Further, the network entity may generate a different secure key to authenticate the UE each time the UE requests to access the voicemail account at the voicemail server. In one example, the network entity may generate the secure key using an algorithm such as a pseudo-random number generator (PRNG). The network entity may use the PRNG to generate numbers for use in an RSA key.

Referring to the network entity 300 in FIG. 3, the reference data 310 of the network entity 300 may include secure key data for each of various UEs and the network entity 300 may thus associate a transmitted secure key to a particular UE. In particular, the reference data 310 may store an assigned secure key to a particular UE in correlation with the unique identifier of that UE. In an example implementation, the reference data 310 may only store the secure key most recently transmitted to each particular UE. Further, the network entity 300 may invalidate and/or delete a secure key from its reference data 310 once it has been used by a particular UE to avoid the possibility of a UE using the same secure key twice.

At block 508, the UE then transmits to the voicemail server an origination request including the received secure key. In one example, the UE transmits the origination request to the voicemail server via an access network, such as the access network 102 described in FIG. 1, or the access network 202 described in FIG. 2. The origination request may be a request to engage in a VoIP session with the voicemail server to access a voicemail account, as an example. Further, the origination request may identify the UE as the calling party and the voicemail server as the called party, for example, using telephone numbers and/or other unique identifiers.

In one example, transmitting an origination request including the received secure key may involve transmitting a single origination message that contains the secure key. In another example, transmitting an origination request including the received secure key may involve sending multiple messages at the time of initiating communication with the voicemail server, such as an origination request message and separately a message (e.g., an authentication message) that contains the secure key.

By way of an example, the origination request may include a Session Initiation Protocol (SIP) INVITE message from the UE to the voicemail server. Further, the SIP INVITE message may include the most recently received secure key in an authentication-information ("Authentication-Info") header of the SIP INVITE message. The SIP INVITE message transmitted by the UE may invoke initiation of a Real-time Transport Protocol (RTP) session between the UE and the voicemail server. Using the example architecture of FIG. 2, the UE may transmit the SIP INVITE message via wireless communication link 210 to access network 202. The SIP INVITE message may then pass from access network 202 to packet-switched network 212, and then from packet-switched network 212 to voicemail server 216. Other examples are possible as well.

At block 510, the UE receives from the voicemail server a message responsive to the origination request. The voicemail server may compare the secure key received in the origination request with the secure key most recently transmitted to the UE. As described above, the network entity used to generate the secure key may be the voicemail server, or a data server, as examples. If the network entity used to generate the secure key is the voicemail server, then the voicemail server maintains a list of secure keys transmitted to each particular UE. The voicemail server may then compare the secure key received in an origination request with the secure key most recently transmitted from the voicemail server to that particular UE in order to authenticate that UE. If the network entity used to generate the secure key is a data server, then the data server may be in communication with the voicemail server to determine whether the secure key received in the origination request is the same as the secure key most recently transmitted from the data server to the UE. In such an example, the network entity may maintain a list of secure keys transmitted to each particular UE. The network entity may share that list with the voicemail server via a network communication interface, as an example. As another example, the voicemail server may simply request that the network entity provide the initiating UE's secure key to the voicemail server. The voicemail server may then compare the secure key received in an origination request with the secure key most recently transmitted from the network entity to that particular UE in order to authenticate that UE. In yet another example, the network entity may compare the UE's secure key and subsequently inform the voicemail server if the secure keys are a match. Other examples are possible as well.

If the received secure key is the same as the most recently transmitted secure key, the message responsive to the origination request may indicate a successful authentication of the UE. On the other hand, if the received secure key is not the same as the most recently transmitted secure key, the message responsive to the origination request may indicate a failed authentication of the UE.

If the message responsive to the origination request indicates a successful authentication of the UE, the voicemail server may grant the user access the voicemail account at the voicemail server. As discussed above, accessing the voicemail account may enable the user to retrieve stored voicemail messages, delete voicemail messages, record a personal greeting, and review voicemail message details (e.g., timestamps), among other administrative functions.

In another example, an additional layer of security may be desirable before enabling the user to access a voicemail account. In such an example, even if the message responsive to the origination request indicates a successful authentication of the UE, the voicemail server may request an additional form of authentication before granting the user access to their voicemail account. The additional form of authentication may be a passcode, such as a four-digit passcode entered by the user at a user interface of the UE. The user may then provide the passcode at the user interface of the UE, and the UE may transmit the passcode to the voicemail server. The voicemail server may maintain a list of passcodes associated with each particular UE. The voicemail server may then compare the passcode provided by the user with the passcode associated with that particular UE in order to further authenticate that UE. In another example, the additional form of authentication may be a verbal input from a user, such as a verbal password spoken into the user interface of the UE. Other examples are possible as well.

Further, if the message responsive to the origination request indicates a failed authentication of the UE, the UE may similarly receive from the voicemail server a request for a passcode in order to access the voicemail account. As discussed above, the passcode may be a four-digit passcode entered by a user at a user interface of the UE. In another example, the UE may receive from the voicemail server a request for a verbal input if the message responsive to the origination request indicates a failed authentication of the UE. Other examples are possible as well.

As a specific example, the message responsive to the origination request may be a SIP 200 OK message sent to the UE in response to a SIP INVITE message. The voicemail server may send the SIP 200 OK message if the secure key transmitted in the Authentication-Info header of the SIP INVITE message matches the secure key most recently transmitted to the UE. The SIP 200 OK message may indicate a successful authentication of the UE. The UE may next transmit a SIP ACK message, completing establishment of an RTP session, and thereby allowing the voicemail server to communicate with the UE. On the other hand, the voicemail server may determine that the secure key transmitted in the Authentication-Info header of the SIP INVITE message is different than the secure key most recently transmitted to the UE. In one example, the voicemail server may subsequently send a SIP CANCEL message to cancel a pending RTP session. In another example, the voicemail server may still establish an RTP session with such a UE without granting the UE access to the voicemail account, so as to, for example, request and receive a passcode, or carry out other functions. If the received passcode does not match the passcode associated with that particular UE, the voicemail server may then send a SIP BYE message to the UE to end the established RTP session. Other example messages in response to the origination request are possible as well.

Figure 6:
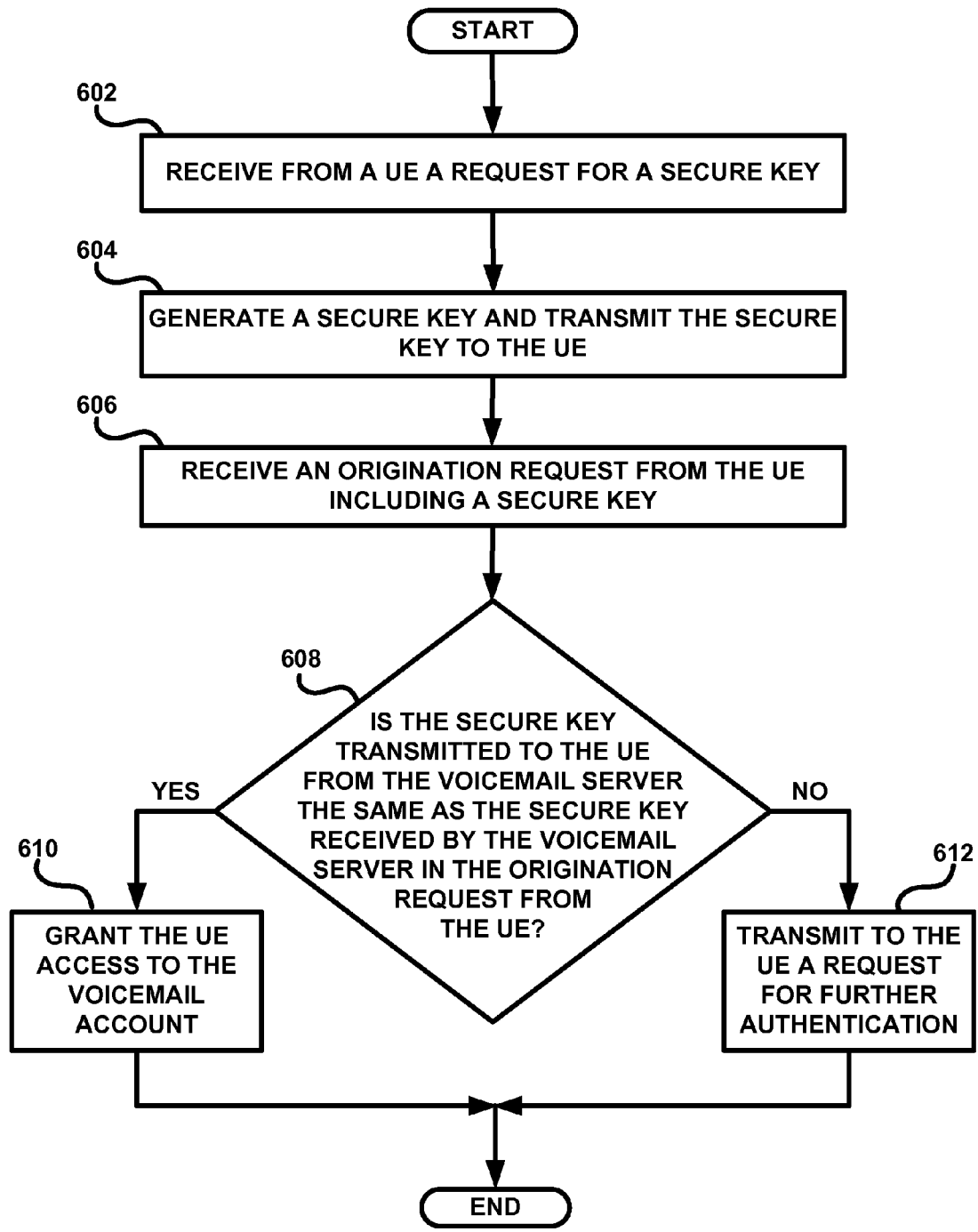
FIG. 6 is another flow chart depicting functions that can be carried out in accordance with the method.

FIG. 6 is a flowchart of a method from another perspective. At block 602, the voicemail server receives from a UE a request for a secure key. As discussed above, the UE may request the secure key via an HTTPS connection. Further, the secure key may be an RSA key, or some other secure key.

At block 604, the voicemail server then generates a secure key and transmits the secure key to the UE. The voicemail server may transmit the secure key to the UE via an HTTPS connection. Further, the voicemail server may generate a new secure key each time a particular UE requests a secure key. That way, a different secure key is used to authenticate the UE each time the UE requests to access a voicemail account at the voicemail server. The voicemail server may store secure key data for each of various UEs and may thus associate a transmitted secure key to a particular UE. In one example, the secure key may further associate a unique identifier of a particular UE with the secure key transmitted to that UE, as discussed above.

At block 606, the voicemail server then receives an origination request from the UE including a secure key. The UE may transmit the origination request to the voicemail server via an access network, such as the access network 102 described in FIG. 1 or the access network 202 as described in FIG. 2. The origination request may be a request to engage in a VoIP session with the voicemail server to access a voicemail account, as an example. As another example, the origination request may be a SIP INVITE message to the voicemail server. Further, the SIP INVITE message may include the secure key most recently received by the UE in an Authentication-Info header of the SIP INVITE message.

At block 608, the voicemail server compares the secure key transmitted to the UE with the secure key received by the voicemail server in the origination request. If the secure key transmitted to the UE from the voicemail server is the same as the secure key received by the voicemail server in the origination request from the UE, the voicemail server grants the UE access to the voicemail account, as shown in block 610. Accessing the voicemail account may enable the user to retrieve stored voicemail messages, delete voicemail messages, record a personal greeting, and review voicemail message details (e.g., timestamps), as discussed above.

If the secure key transmitted to the UE from the voicemail server is different than the secure key received by the voicemail server in the origination request from the UE, the voicemail server transmits to the UE a request for further authentication, as shown in block 612. The request for further authentication may be request for a passcode, such as a four-digit passcode entered by a user at a user interface of the UE. In another example, the request for further authentication may be request for a verbal input from a user, such as a verbal password spoken into the user interface of the UE. Other examples are possible as well.

III. CONCLUSION

While exemplary embodiments have been described, persons of skill in the art will appreciate that variations may be made without departure from the scope and spirit of the invention, as defined by the claims.

What is claimed is:

1. A method operable by a user equipment device (UE), the method comprising:
   the UE receiving a user input indicating a request to access a voicemail account at a voicemail server;
   in response to receiving the user input, the UE transmitting to a network entity a request for a secure key;
   receiving from the network entity a response providing the secure key;
   in response to the UE receiving the response providing the secure key, the UE transmitting to the voicemail server an origination request, wherein the origination request comprises a Session Initiation Protocol (SIP) INVITE message including the received secure key; and
   receiving, into the UE from the voicemail server, a message responsive to the origination request.

2. The method of claim 1, wherein the message responsive to the origination request indicates a successful authentication of the UE.

3. The method of claim 2, further comprising:
   in response to receiving the message responsive to the origination request indicating the successful authentication of the UE, the UE accessing the voicemail account.

4. The method of claim 3, wherein accessing the voicemail account enables the UE to perform one or more functions including retrieving a voicemail message stored on the voicemail server, deleting a voicemail message stored on the voicemail server, and recording a personal greeting.

5. The method of claim 2, further comprising:
   after receiving the message responsive to the origination request indicating the successful authentication of the UE, the UE receiving from the voicemail server a request for further authentication to access the voicemail account.

6. The method of claim 5, wherein the request for further authentication to access the voicemail account comprises a request for a passcode.

7. The method of claim 5, wherein the request for further authentication to access the voicemail account comprises a request for a verbal input from the user.

8. The method of claim 1, wherein the message responsive to the origination request indicates a failed authentication of the UE.

9. The method of claim 8, further comprising:
   after receiving the message responsive to the origination request indicating the failed authentication of the UE, the UE receiving from the voicemail server a request for a passcode to access the voicemail account.

10. The method of claim 1, wherein the SIP INVITE message includes the received secure key in an authentication-information header of the SIP INVITE message.

11. The method of claim 1, wherein the secure key is a different key generated each time the user requests to access the voicemail account at the voicemail server.

12. The method of claim 1, wherein the network entity is the voicemail server.

13. A computing device comprising:
    a processor;
    data storage; and
    program instructions, stored in the data storage that, upon execution by the processor, cause the computing device to:
    receive a user input indicating a request to access a voicemail account at a voicemail server;
    in response to receiving the user input, transmit to a network entity a request for a secure key;
    receive from the network entity a response providing the secure key;
    in response to receiving the secure key, transmit to the voicemail server a first message, wherein the first message comprises a Session Initiation Protocol (SIP) INVITE message including the received secure key; and
    receive, into the computing device from the voicemail server, a second message responsive to the first message.

14. The computing device of claim 13, wherein the second message responsive to the first message indicates a failed authentication of the computing device.

15. The computing device of claim 14, wherein after receiving the second message responsive to the first message indicating the failed authentication of the computing device, the program instructions further cause the computing device to:
    receive from the voicemail server a request for a passcode to access the voicemail account.

16. The computing device of claim 13, wherein the secure key is a different key generated each time the user requests to access the voicemail account at the voicemail server.

17. A method operable by a voicemail server, the method comprising:
    the voicemail server receiving from a user equipment device (UE) a request for a secure key;
    in response to receiving the request for the secure key, the voicemail server generating a first secure key and transmitting the first secure key to the UE;
    the voicemail server receiving an origination request from the UE, wherein the origination request comprises a Session Initiation Protocol (SIP) INVITE message including a second secure key;
    the voicemail server comparing the first secure key transmitted to the UE from the voicemail server with the second secure key received by the voicemail server in the origination request from the UE; and
    if the first secure key is the same as the second secure key, the voicemail server granting the UE access to a voicemail account at the voicemail server, but if the first secure key is different than the second secure key, the voicemail server transmitting to the UE a request for further authentication to access the voicemail account.

18. The method of claim 17, wherein the SIP INVITE message includes the received second secure key in an authentication-information header of the SIP INVITE message.

19. The method of claim 17, wherein the request for further authentication to access the voicemail account comprises a request for a passcode.

* * * * *